United States Patent [19]

Makinoda

[11] Patent Number: 4,659,465
[45] Date of Patent: Apr. 21, 1987

[54] WASHING APPARATUS FOR FILTER PRESSES

[75] Inventor: Mitsugi Makinoda, Kobe, Japan

[73] Assignee: Kurita Machinery Manufacturing Company, Osaka, Japan

[21] Appl. No.: 763,215

[22] Filed: Aug. 7, 1985

[30] Foreign Application Priority Data

Aug. 17, 1984 [JP] Japan .................. 59-125472[U]

[51] Int. Cl.⁴ .................. B01D 25/32; B01D 33/00
[52] U.S. Cl. .................. 210/225; 100/198; 134/172; 210/230; 210/236
[58] Field of Search ............ 100/198; 210/224–231, 210/236; 134/172

[56] References Cited

U.S. PATENT DOCUMENTS

| | | | |
|---|---|---|---|
| 3,486,624 | 12/1969 | Sykes | 100/198 |
| 3,780,747 | 12/1973 | Stadie et al. | 210/225 X |
| 4,229,303 | 10/1980 | Heinrich et al. | 210/225 |
| 4,289,618 | 9/1981 | Schotten et al. | 210/225 X |

FOREIGN PATENT DOCUMENTS

| | | | |
|---|---|---|---|
| 52-50066 | 4/1977 | Japan | 210/225 |
| 53-30075 | 3/1978 | Japan | 210/225 |
| 35161 | 11/1980 | Japan | . |
| 59-39311 | 3/1984 | Japan | 210/225 |
| 2046117B | 11/1980 | United Kingdom | . |

*Primary Examiner*—Richard V. Fisher
*Assistant Examiner*—W. Gary Jones
*Attorney, Agent, or Firm*—Holman & Stern

[57] ABSTRACT

A washing apparatus for filter presses which is used for washing filter cloths on filter plates upon completion of filtration comprises a carriage disposed above the filter plates, a pantograph attached to the carriage, a fluid cylinder having its rod connected to the intermediate pivot of the pantograph, a washing liquid spraying pipe connected to the lower link overlap region of the pantograph and having nozzles, multiple extensible pipes disposed between the carriage and opposite sides of the pantograph attaching region of the washing liquid spraying pipe for holding the washing liquid spraying pipe horizontal, and a flexible conduit connected to the washing liquid spraying pipe and adapted to move to follow the expansion and contraction of the pantograph.

7 Claims, 4 Drawing Figures

WASHING APPARATUS FOR FILTER PRESSES

BACKGROUND OF THE INVENTION

1. Field of the Invention

This invention relates to a washing apparatus for filter presses and more particularly it relates to an apparatus for washing filter cloths being pulled by filter plates as the latter are separated one by one toward a movable end plate upon completion of filtration or for washing the filter plate surfaces after having the filter cloth removed therefrom.

2. Description of the Prior Art

Filter washing means using a horizontal spray pipe adapted to be vertically moved between opened filter plates by a pantograph mechanism is known, as disclosed, e.g., in Japanese Patent Publication No. 35161/1980 and U. K. Patent No. 2,046,117.

In the former, a bushing 4 fixedly fitted in a bevel gear 3 is formed with an internal thread, while a threaded bar 6 threadedly engaged with said internal thread of the bushing is vertically moved by the rotation of a geared motor 1 to thereby effect vertical movement of filter washing means 19 which comprises a spray pipe connected to the lower end of a pantograph 8. With this arrangement, however, when said filter washing means is pulled upwardly of the filter plates, the screw shaft, or bar, threadedly engaged with the bushing projects high above the geared motor and thus has the disadvantage of requiring a high space above the filter press.

On the other hand, in U. K. Patent No. 2,046,117, one link of a link connection for a pantograph is used as a washing liquid pipe and the ends of the washing liquid pipe are connected by liquid seal joints. The middle of each washing liquid pipe is pivoted to a bar which is the other element of the pantograph. The washing liquid pipe together with the bar performs pantograph motion. The lowermost element of the pantograph is a spray pipe having a number of liquid spraying holes, with a link connected to one end thereof which link causes the spray pipe to ascend or descend in a horizontal posture. However, since the rod of the actuator is obliquely connected at a position considerably spaced away from the middle of the link width of the pantograph, the pantograph tends to sway. Another disadvantage of this arrangement is that leakage of liquid can easily occur since the perfectness of the leakage preventive seat construction at the opposite end of the washing liquid pipe in the pantograph can hardly be maintained.

BRIEF SUMMARY OF THE INVENTION

This invention provides improvements in a washing apparatus for filter presses and is intended to provide a washing apparatus for filter presses designed to positively effect actuation of the pressure medium actuator, stabilize the horizontal posture of the filter washing means, and preclude the necessity of a high space otherwise required when the filter washing means is pulled upwardly of the filter plates.

According to this invention, there is provided a filter cloth washing apparatus for filter presses, comprising guide members installed above filter plates and having mounted thereon a carriage movable in the direction of disposition of the filter plates, a pressure medium actuator mounted on said carriage, a pantograph whose upper link overlap region is pivoted to the bottom of the carriage and which is capable of vertically moving back and forth, the rod of said pressure medium actuator being connected to the intermediate pivot of said pantograph, a liquid spraying pipe having a predetermined number of nozzles, said liquid spraying pipe being disposed at the lower link overlap region of the pantograph widthwise of the filter plates, extensible pipes with guide shafts erected at opposed positions equally spaced from the middle of said washing liquid spraying pipe, said guide shafts being telescopically inserted in guide pipes mounted on the carriage, and a flexible conduit capable of moving following the expansion and contraction of the pantograph, said flexible conduit being connected to the washing liquid spraying pipe.

According to this invention, when the rod of the pressure medium actuator downwardly connected to the intermediate pivot of the pantograph is vertically advanced and retracted, the washing liquid spraying pipe attached to the lower link overlap region of the pantograph can be efficiently moved up and down at a traveling speed greater than the vertical traveling speed of said rod.

According to this invention, the pressure medium actuator is disposed on the same line as the path along which the middle pivot for the links of the pantograph moves during expansion and contraction, i.e., the stroke path of the middle of the pantograph motion, and the actuating rod thereof is connected to the middle pivot in the intermediate region of the pantograph. Therefore, the actuator rod most rationally imparts a vertical action to the middle pivot of the pantograph, allowing the latter to move smoothly along the filter plate surfaces without causing a sway to the pantograph.

Further, since the vertical guide shafts on the holder of the washing liquid spraying pipe at the lower end of the pantograph are telescopically inserted in the guide pipes mounted on the carriage, at positions equally spaced from the middle of said washing liquid spraying pipe, the washing liquid spraying pipe can be operated in accurately parallel relation to the filter plate surfaces and in a horizontal posture, performing effective washing.

BRIEF DESCRIPTION OF THE DRAWINGS

The invention will now be described in detail with reference to the accompanying drawings wherein.

DETAILED DESCRIPTION

Figure 1:
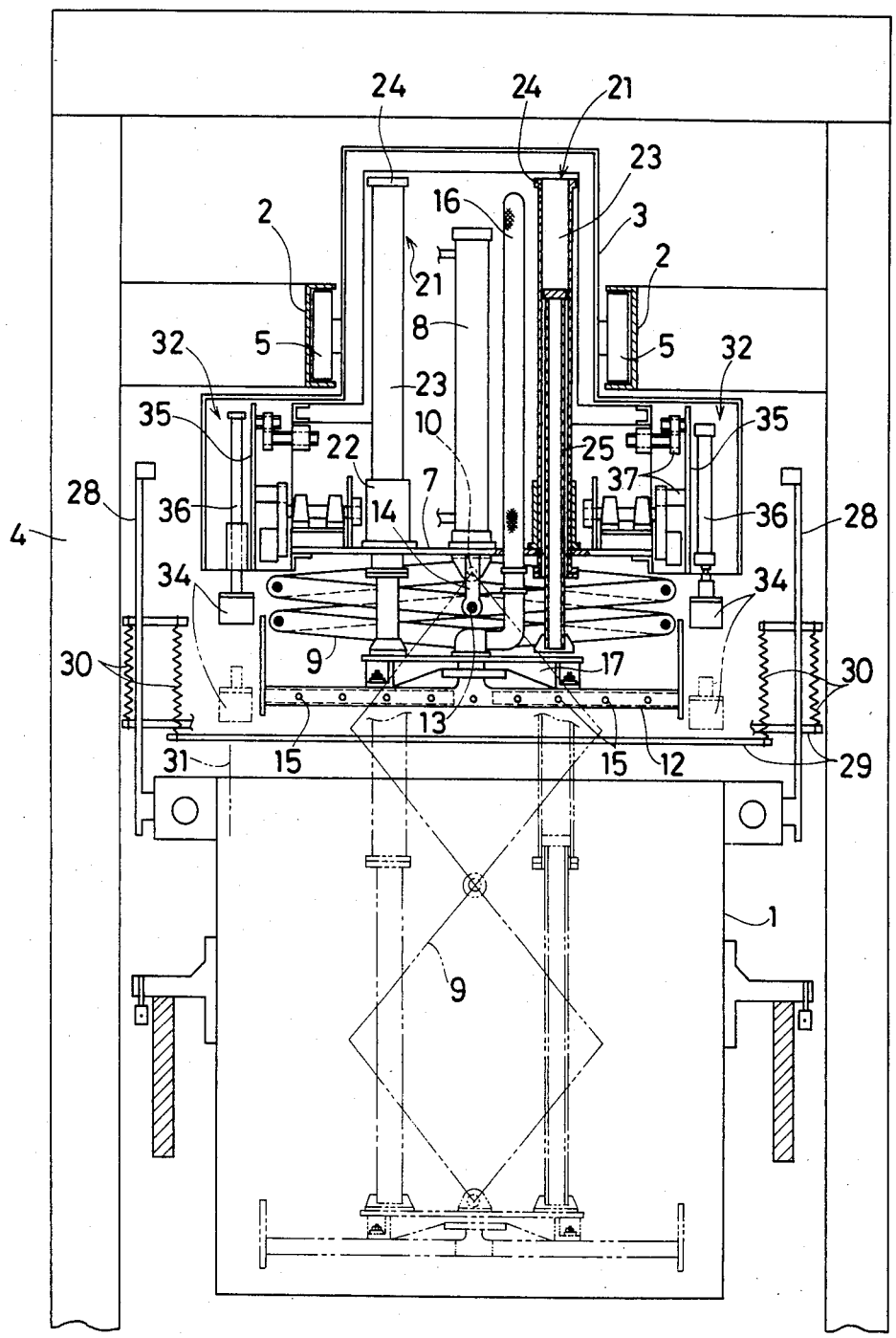
FIG. 1 is a front elevational view of an embodiment of this invention.
Figure 2:
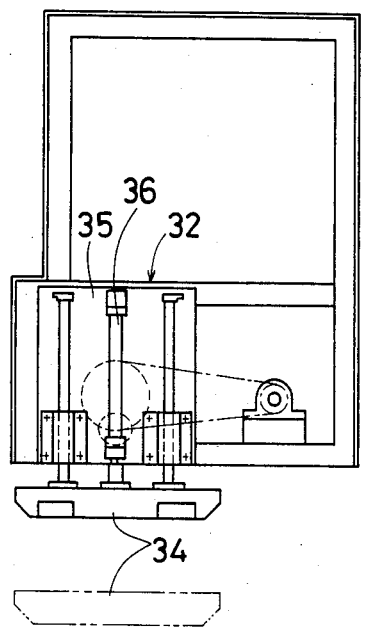
FIG. 2 is a reduced side elevational view of the cake removing device only in FIG. 1.
Figure 3:
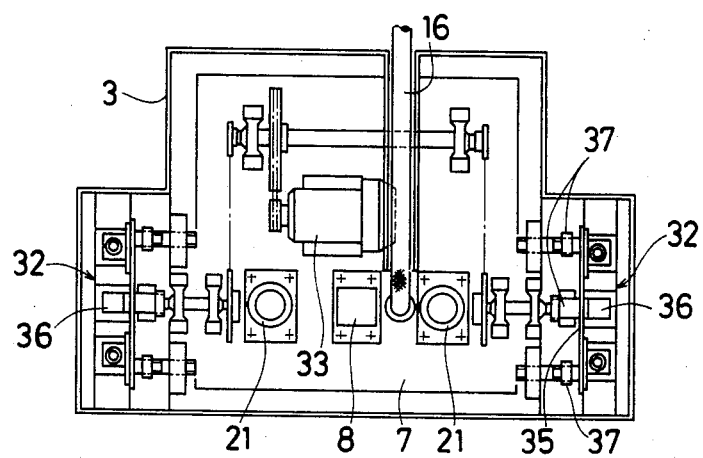
FIG. 3 is a reduced top plan view of FIG. 1.
Figure 4:
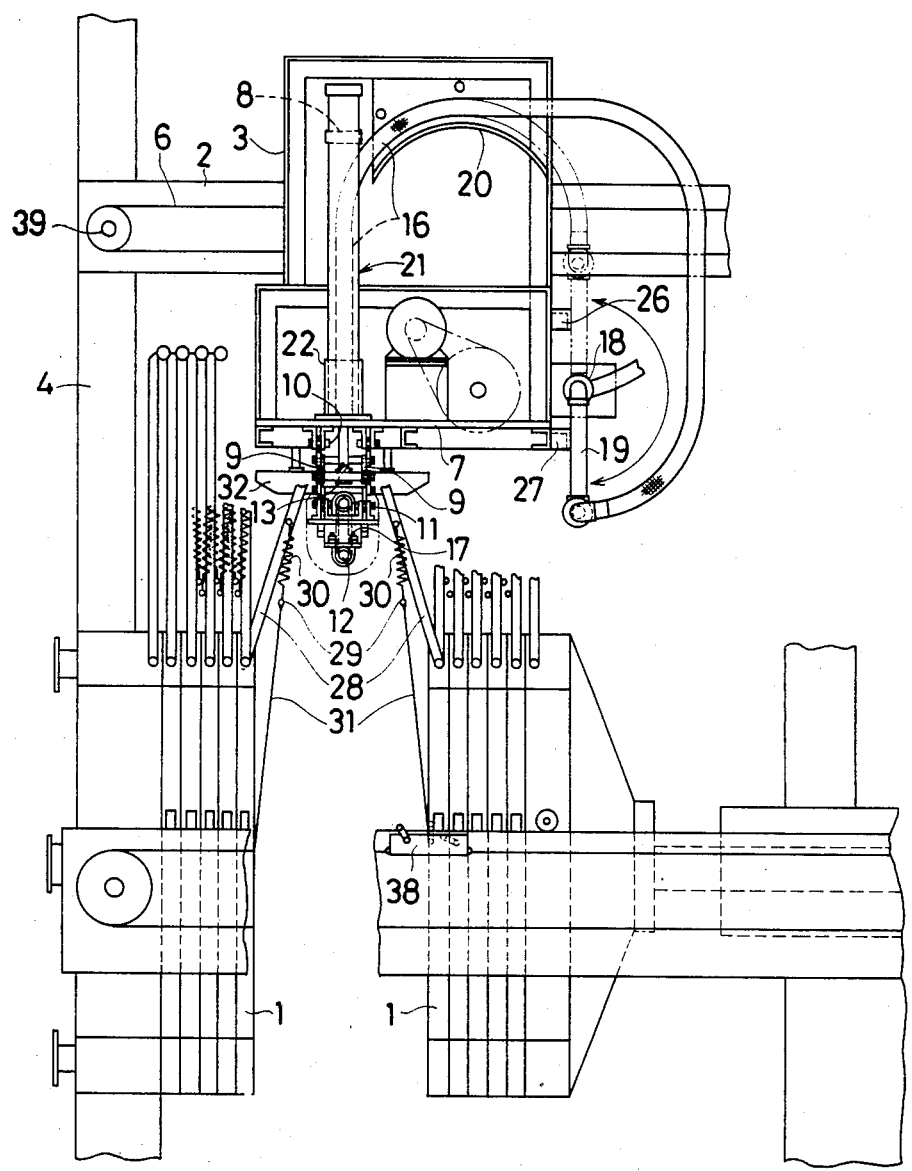
FIG. 4 is a right-hand side view of FIG. 1 with the cake removing device omitted for clarity.

As shown in FIGS. 1 and 4, the filter cloth washing apparatus of this embodiment of the invention mounted on a carriage 3 disposed above filter plates 1. The carriage 3 is movably mounted on guide members 2 disposed above the filter plates in the direction of disposition thereof. The guide members 2 are each in the form of a channel bar and are held on a gate type pillar 4 which is shaped to surround the right and left sides and top of the filter plates 1. This arrangement may be made otherwise. The carriage 3 has two sets of rollers 5 journaled on opposite sides thereof. These rollers 5 are installed in the grooves of the guide members 2. The carriage 3 is connected to a point on a chain 6 entrained around a pair of sprocket wheels 39 to extend along the guide member 2. The chain 6 is driven by an unillustrated motor in response to each separation of the filter plates 1 which is effected one by one, whereby the carriage 3 is moved in the direction opposite to the direction of separation of the filter plates 1.

An air cylinder 8 is attached vertically to the upper surface of the horizontal bottom plate 7 of the carriage 3 adjacent to the filter plates 1. A pantograph 9 is attached to the lower surface of the horizontal bottom plate 7. The upper end link overlap region 10 of the pantograph 9 is pivoted to the lower surface of the horizontal bottom plate 7, and the lower end link overlap region 11 has a washing liquid spraying pipe 12 connected thereto by a spray pipe holder member 17 pivotally connected to the overlap region 11. The intermediate pivot portion 13 of the pantograph 9 connects the portion where two links of the pantograph 9 cross each other. The intermediate pivot portion 13 is pivotally connected to the front end of the rod 14 of the air cylinder 8. The washing liquid spraying pipe 12 is formed with a required number of nozzles or nozzle holes 15 disposed widthwise of the separated filter plates 1 and, moreover, it has connected thereto through the spray pipe holder member 17 a flexible conduit 16 which is adapted to move vertically together with the washing liquid spraying pipe 12 as the pantograph 9 is expanded and contracted.

The flexible conduit 16 extends upward from the spray pipe holder member 17, turns to provide a horizontal portion in the vicinity of the upper end of the air cylinder 8 as shown in FIG. 4, curves downward and is finally rotatably connected to a short connection pipe 19. The other end of the short connection pipe 19 is rotatably connected to a washing liquid feed pipe 18. The washing liquid feed pipe 18 is horizontally connected to the carriage 3. When the flexible conduit 16 is pulled by the downward movement of the washing liquid spraying pipe 12, it is moved along the guide member 20 of the carriage 3. When the flexible conduit 16 is pulled, the short connection pipe 19 is rotated counterclockwise around the washing liquid feed pipe 18. The short connection pipe 19, after being rotated, abuts against an upper stopper 26 projecting from the carriage 3. The flexible conduit 16 is adapted to pay out a length necessary for the washing liquid spraying pipe 12 to descend. When the washing liquid spraying pipe 12 is moved upward by the pantograph 9, the flexible conduit 16 will form an excess length corresponding to the upward movement thereof. This excess length is taken up, rather than slacking, by the short connection pipe 19 which is rotated. The short connection pipe 19 is rotated from the phantom line position shown in FIG. 4 to the solid line position where it abuts against a lower stopper 27.

Multiple extensible telescoping pipes 21 for horizontally holding the washing liquid spraying pipe 12 are installed between the carriage 3 and both sides of the region where the pantograph is attached to the spray pipe holder member 17. Each multiple extensible pipe 21, as shown in FIG. 1, comprises a first slide pipe 23 and a second slide pipe 25. The first slide pipe 23 slides in a guide pipe 22 fixed to the horizontal bottom plate 7 of the carriage 3 and has a stopper 24 on the upper end thereof. The number of slide pipes is not limited to 2 but may be changed according to the vertical distance to be traveled by the washing liquid spraying pipe 12.

In addition to the aforesaid washing device, cake removing devices 32 are provided on the right and left sides (as viewed in FIG. 4) of the carriage 3. The cake removing devices 32 impart impacts to the separated filter plates 1 upon completion of filtration to thereby remove cakes adhering to filter cloths 31. Each filter cloth 31 is suspended by a spring 30 on a suspension arm through a suspension bar 29. The suspension arms project upward from the opposite upper portions of the filter plates 1. The cake removing devices 32 are operated by a motor 33. Each cake removing device 32 has an impact member 34 which is adapted to impart vibrations to the filter cloths 31 through the suspension bars 29. Each impact member 34 is vertically moved by an air cylinder 36. The air cylinder 36 is attached to a vibrating plate 35 which is pivotally connected at its middle and upper right and left to crank shafts 37. The numeral 38 denotes a filter plate transfer device.

The operation of the washing device will now be described.

Upon completion of filtration, a movable end plate which has been cooperating with a fixed end plate to clamp a required number of filter plates 1 therebetween is retracted. After the movable end plate has been retracted, the filter plates 1 are transferred one by one toward the fixed end plate by the filter plate transfer device 38.

Each time the retracting movement of a filter plate 1 is detected by a detector element such as a limit switch, an unillustrated carriage driving motor receives the detection signal and is driven to move carriage 3 is moved on the guide members 2 in the direction opposite to the direction of retraction of the filter plates 1. When the washing liquid spraying pipe 12 held by the carriage 3 is positioned between separated filter plates 1 as a result of the travel of the carriage 3, the latter is stopped. The air cylinder 8, which has been keeping the washing liquid spraying pipe 12 in its waiting position in the upper region through the pantograph 9, is fed with pressurized air for lowering the rod 14. As a result, the pantograph 9 connected at its intermediate pivot 13 to the rod 14 is downwardly extended, so that the washing liquid spraying pipe 12 connected to the lower link overlap region 11 of the pantograph 9 through the spray pipe holder member 17 is lowered between filter plates 1 as it is held horizontal by the multiple extensible pipes 21.

The washing liquid spraying pipe 12 lowered between filter plates 1 is then fed with washing liquid from an unillustrated washing liquid supply source through the washing liquid feed pipe 18 and flexible conduit 16, and filter cloths 31 are washed with washing liquid spraying through the nozzles or nozzle holes 15. When the washing liquid spraying pipe 12 reaches the lowermost position, the feed of pressurized air to the air cylinder 8 is switched over to raise the rod 14, and the washing liquid spraying pipe 12 moving upward while continuing to spray washing liquid stops the spraying of washing liquid when it comes above the filter plates 1.

When the washing liquid spraying pipe 12 is raised to its original waiting position, the feed of pressurized air to the air cylinder 8 is stopped. When the next filter plate 1 is retracted, the same series of movements as described above are repeated.

In the last washing operation with all the filter plates 1 transferred toward the movable end plate, when the washing liquid spraying pipe 12 is vertically reciprocated to finish the washing operation, the carriage driving motor is reversed to return the carriage 3 to its initial position, whereupon the carriage 3 is stopped and waits for the next washing operation.

According to the apparatus of this embodiment, the carriage is mounted on the guide members disposed above the filter plate disposition section so that it is movable in the direction of disposition of the filter plates, the pantograph having the washing liquid spraying pipe at its lower end is vertically moved by the downwardly extending air cylinder, and the washing liquid spraying pipe is held horizontal by horizontality retaining members in the form of multiple extensible pipes disposed on opposite sides of the pantograph attaching region. As a result of this arrangement, the travel of the washing liquid spraying pipe on its upward or downward stroke can be efficiently effected by an air cylinder which is about half as long as the distance to be traveled and, moreover, the washing device can be reduced in size by reducing its height.

Further, since the washing device moving above the filter plate disposition region can be made independent of the filter plate transfer device and other devices built in the filter press, superior performance can be imparted thereto by a simple arrangement.

I claim:

1. A washing apparatus for filter presses comprising:
    a plurality of filter plates supported in stacked relationship for relative opening and closing movement of adjacent filter plates;
    guide members mounted above said filter plates;
    a carriage movably mounted on said guide members for movement in the direction of said opening and closing of said filter plates;
    a pantograph device having an upper link overlap region pivotally connected to said carriage, a lower link overlap region and an intermediate pivot point between said upper and lower link overlap regions;
    a washing liquid spraying pipe mounted on said lower link overlap region;
    a pressure medium operated actuator mounted on said carriage operatively connected to said pantograph device at said intermediate pivot point so that operation of said actuator vertically advances and retracts said pantograph device to respectively lower and raise said spraying pipe;
    a plurality of spraying nozzles operatively mounted in spaced relation on said spraying pipe in the direction of the width of said filter plates; and
    a flexible washing liquid conduit movably supported on said carriage and having one end thereof connected to said spraying pipe and the other end connectable to a source of washing liquid so that said one end can move with said spraying pipe to feed washing liquid to said pipe to spray through said nozzles as said pipe is lowered and raised.

2. A washing apparatus as claimed in claim 1 wherein:
    said actuator comprises a fluid pressure operated piston and cylinder device;
    said cylinder is mounted on said carriage with its longitudinal axis substantially vertical so that the outer end of a piston rod attached to the piston moves upwardly and downwardly; and
    the outer end of the piston rod is pivotally connected to said intermediate pivot point.

3. A washing apparatus as claimed in claim 2 and further comprising:
    a spraying pipe holder member pivotally connected to said lower link overlap region;
    means to mount said spraying pipe on said spraying pipe holding member; and
    wherein said pivotal connections are substantially vertically aligned with the longitudinal axis of said cylinder.

4. A washing apparatus for filter presses comprising:
    a plurality of filter plates supported in stacked relationship for relative opening and closing movement of adjacent filter plates;
    guide members mounted above said filter plates;
    a carriage movably mounted on said guide members for movement in the direction of said opening and closing of said filter plates;
    a pantograph device having an upper link overlap region pivotally connected to said carriage and a lower link overlap region;
    a washing liquid spraying pipe mounted on said lower link overlap region;
    a pressure medium operated actuator mounted on said carriage operatively connected to said pantogrpah so that operation of said actuator vertically advances and retracts said pantograph device to respectively lower and raise said spraying pipe;
    a plurality of spraying nozzles operatively mounted in spaced relation on said spraying pipe in the direction of the width of said filter plates;
    a flexible washing liquid conduit movably supported on said carriage and having one end thereof connected to said spraying pipe and the other end connectable to a source of washing liquid so that said one end can move with said spraying pipe to feed washing liquid to said pipe to spray through said nozzles as said pipe is lowered and raised; and
    a plurality of multiple extensible pipe units mounted on said carriage and operatively connected in relative spaced relationship to said spraying pipe to maintain said spraying pipe substantially horizontal.

5. A washing apparatus as claimed in claim 4, wherein each multiple extensible pipe unit comprises:
    an outer guide sleeve mounted on said carriage with its central axis substantially vertical; and
    an elongated pipe member telescopingly mounted within said guide sleeve and connected at its lower end to said spraying pipe.

6. A washing apparatus for filter presses comprising:
    a plurality of filter plates supported in stacked relationship for relative opening and closing movement of adjacent filter plates;
    guide members mounted above said filter plates;
    a carriage movably mounted on said guide members for movement in the direction of said opening and closing of said filter plates;
    a pantograph device having an upper link overlap region pivotally connected to said carriage and a lower link overlap region;
    a washing liquid spraying pipe mounted on said lower link overlap region;
    a fluid pressure operated piston and cylinder actuator mounted on said carriage operatively connected to said pantograph so that operation of said actuator vertically advances and retracts said pantograph device to respectively lower and raise said spraying pipe;

a plurality of spraying nozzles operatively mounted in spaces relation on said spraying pipe in the direction of the width of said filter plates;

a flexible washing liquid conduit movably supported on said carriage and having one end thereof connected to said spraying pipe and the other end connectable to a source of washing liquid so that said one end can move with said spraying pipe to feed washing liquid to said pipe to spray through said nozzles as said pipe is lowered and raised;

an intermediate pivot point on said pantograph device between said upper and lower link overlap regions;

a piston rod attached to said piston and having an outer end;

said cylinder being mounted on said carriage with its longitudinal axis substantially vertical so that said outer end of said piston rod moves upwardly and downwardly;

said outer end of said piston rod being pivotally connected to said intermediate pivot point;

a spraying pipe holding member pivotally connected to said lower link overlap region;

said pivotal connections being substantially vertically aligned with the longitudinal axis of said cylinder;

means to mount said spraying pipe on siad spraying pipe holding member; and a plurality of multiple extensible pipe units mounted on said carriage and operatively connected in relative spaced relationship to said spraying pipe holding member to maintain said spraying pipe holding member substantially horizontal.

7. A washing apparatus as claimed in claim 6, wherein each multiple extensible pipe unit comprises:

an outer guide sleeve mounted on said carriage with its central axis substantially vertical; and an elongated pipe member telescopingly mounted within said guide sleeve and connected at its lower end to said spraying pipe holding member.

* * * * *